United States Patent
Kikkawa et al.

(10) Patent No.: US 9,003,016 B2
(45) Date of Patent: Apr. 7, 2015

(54) INFORMATION PROCESSING APPARATUS, INFORMATION PROCESSING METHOD, AND PROGRAM

(75) Inventors: Norifumi Kikkawa, Tokyo (JP); Kei Yamashita, Kanagawa (JP); Yoshihiko Ikenaga, Tokyo (JP); Yuichi Izumi, Tokyo (JP); Shinji Takae, Tokyo (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 13/116,925

(22) Filed: May 26, 2011

(65) Prior Publication Data
US 2011/0302300 A1    Dec. 8, 2011

(30) Foreign Application Priority Data
Jun. 2, 2010    (JP) ................ P2010-127081

(51) Int. Cl.
*G06F 15/173*    (2006.01)
*G06F 15/16*    (2006.01)
*H04L 12/28*    (2006.01)

(52) U.S. Cl.
CPC .......... *H04L 12/2809* (2013.01); *H04L 12/281* (2013.01); *H04L 12/2812* (2013.01)

(58) Field of Classification Search
USPC ........................ 709/201–205, 217–219, 250
See application file for complete search history.

(56) References Cited

U.S. PATENT DOCUMENTS

| | | | |
|---|---|---|---|
| 2003/0009760 A1* | 1/2003 | Sakamoto et al. | 725/74 |
| 2006/0112179 A1* | 5/2006 | Baumeister et al. | 709/226 |
| 2006/0156307 A1* | 7/2006 | Kunjithapatham et al. | 718/103 |
| 2008/0034072 A1* | 2/2008 | He et al. | 709/223 |
| 2010/0159898 A1* | 6/2010 | Krzyzanowski et al. | 455/414.1 |
| 2011/0055004 A1* | 3/2011 | Libby | 705/14.45 |
| 2011/0138064 A1* | 6/2011 | Rieger et al. | 709/228 |

FOREIGN PATENT DOCUMENTS

| | | |
|---|---|---|
| EP | 1 276 274 A2 | 1/2003 |
| EP | 1 679 828 A1 | 7/2006 |
| WO | WO 2004/062227 A2 | 7/2004 |

OTHER PUBLICATIONS

European Search Report issued Aug. 16, 2011 in corresponding European patent application No. EP 11 16 7729.

* cited by examiner

*Primary Examiner* — Un C Cho
*Assistant Examiner* — M Mostazir Rahman
(74) *Attorney, Agent, or Firm* — Finnegan Henderson Farabow Garrett & Dunner LLP

(57) ABSTRACT

An apparatus and method provide logic for formatting electronic content. In one implementation, an apparatus includes an identification unit configured to identify a plurality of devices associated via a network, and a receiving unit configured to receive information corresponding to the associated devices. The information includes a function provided by the associated devices and performance data corresponding to the associated devices. A generation unit is configured to generate a first value of an execution metric describing at least one of an execution of the function by the associated devices or the performance data corresponding to the associated devices, based on at least the received information, and an output unit is configured to output the first metric value.

17 Claims, 12 Drawing Sheets

DGTLTV ABC11-12345

Device Menu

PLAY CONTENT
TRANSFER SCREEN
CHANGE APPLIANCE SETTINGS

INSTRUCTION MANUAL
CONFIRM LINKED APPLIANCE

DGTLTV ABC11-12345

INSTRUCTION MANUAL

WATCH TV
CONTROL CONNECTED APPLIANCE
PLAY CONTENT FROM NETWORK

1070

DGTLTV ABC11-12345

PLAY CONTENT FROM NETWORK

WATCH VIDEO
LISTEN TO MUSIC
VIEW PHOTOS

1090

DGTLTV ABC11-12345

WATCH VIDEO

OPERATION METHOD
HELP
FUNCTION DETAILS

Function View

ACTIONS AVAILABLE BY COMBINING APPLIANCES

| | |
|---|---|
| VIEW PHOTOS | COPY PHOTO |
| LISTEN TO MUSIC | EXPORT MUSIC |
| WATCH VIDEOS | EXPORT VIDEO |
| WATCH TV | |
| TIMER RECORDING | |

INFORMATION PROCESSING APPARATUS, INFORMATION PROCESSING METHOD, AND PROGRAM

CROSS-REFERENCE TO RELATED APPLICATIONS

This application is based upon and claims the benefit of priority from Japanese Patent Application JP 2010-127081, filed on Jun. 2, 2010, the entire contents of which are hereby incorporated by reference.

BACKGROUND

1. Technical Field

The disclosed exemplary embodiments relate to an information processing apparatus, an information processing method, and a program, and in more detail, to an information processing apparatus, an information processing method, and a program that support effective use of functions provided by appliances.

2. Description of the Related Art

In recent years, it has become increasingly common for desired functions to be provided by an appliance operating in combination with another appliance, such as when photographs stored on a PC (Personal Computer) in the home are viewed on a television set or when video stored by a video recorder is viewed on a television set in another room. Such appliances are connected to one another by a network such as an IP (Internet Protocol) Network, USB (Universal Serial Bus), or HDMI (High-Definition Multimedia Interface), and as one example provide functions in accordance with guidelines such as DLNA (Digital Living Network Alliance, Registered Trademark). The functions provided by a combination of a plurality of appliances may for example be functions that use the characteristics of the respective appliances, and provide a variety of user experiences (UX).

However, to make use of functions provided by a combination of a plurality of appliances, the user has to make settings of the respective appliances to be combined, which is complex. For example, at the development stage of the respective appliances, since it is not always possible to imagine what other appliances may be used in combination with a given appliance in the future, in many cases the operation manual of such appliance will not include the procedure for combining the appliance with other appliances. As a result, there have been cases where users have been unaware that functions are provided by a plurality of appliances in combination or where users have been aware but have had difficulty in setting the respective appliances, resulting in users being unable to make sufficient use of the functions provided by a combination of a plurality of appliances.

For this reason, technologies for providing users with information relating to functions provided by a combination of a plurality of appliances have been developed. For example, Japanese Laid-Open Patent Publication No. 2003-022224 discloses a technology that displays functions that can be used in accordance with a user selection and/or usage history and transmits instructions required to provide a function selected by the user out of the displayed functions to a plurality of appliances to be combined. Also, Japanese Laid-Open Patent Publication No. 2009-146146 discloses a technology that acquires operation procedures required for functions that can be used from a plurality of appliances to be combined, displays the operation procedures, and executes the operation procedure required for a function selected by the user out of the displayed operation procedures on the plurality of appliances to be combined.

SUMMARY

However, when functions that can be used are presented to the user unconditionally as described in Japanese Laid-Open Patent Publication Nos. 2003-022224 and 2009-146146, it is necessary for the user to evaluate and select a function by himself/herself. For example, when a new appliance is purchased and connected to a network, to find out whether functions newly provided by combinations that include such new appliance are superior to the functions provided by combinations of the existing appliances, it has been necessary for the user to try out and evaluate the newly-provided functions. In addition, in keeping with the increase in the number of appliances that provide functions in combination with other appliances in recent years, it has become increasingly common for the same function to be provided by different combinations of appliances. In such case, it may require a lot of effort, knowledge and time for the user to actually try out different combinations to see which combination of appliances has the most superior performance, and doing so is difficult for all but those with special knowledge.

In light of the foregoing, it is desirable to provide a novel and improved information processing apparatus, information processing method, and program that are capable of providing support so that a user can make appropriate use of functions provided by combinations of a plurality of appliances.

Consistent with an exemplary embodiment, an apparatus includes an identification unit configured to identify a plurality of devices associated via a network, and a receiving unit configured to receive information corresponding to the associated devices. The information comprises a function provided by the associated devices and performance data corresponding to the associated devices. A generation unit is configured to generate a first value of an execution metric describing at least one of an execution of the function by the associated devices or the performance data corresponding to the associated devices, based on at least the received information, and an output unit is configured to output the first metric value.

Consistent with an additional exemplary embodiment, a computer-implemented method evaluates device performance. The method includes identifying a plurality of associated devices, the associated devices being accessible to a user via a network, and receiving information corresponding to the associated devices. The information comprises a function provided by the associated devices and performance data corresponding to the associated devices. The method includes generating, using a processor, a first value of an execution metric describing at least one of an execution of the function by the associated devices or the performance data corresponding to the associated devices, based on at least the received information, and outputting the first metric value.

Consistent with a further exemplary embodiment, a non-transitory, computer-readable storage medium stores a program that, when executed by a processor, causes the processor to perform a method for evaluating device performance. The method includes identifying a plurality of associated devices, the associated devices being accessible to a user via a network, and receiving information corresponding to the associated devices. The information comprises a function provided by the associated devices and performance data corresponding to the associated devices. The method includes generating, using a processor, a first value of an execution metric describing at least one of an execution of the function by the associated devices or the performance data corresponding to the associated devices, based on at least the received information, and outputting the first metric value According to the disclosed exemplary embodiments, it is possible to provide support so that a user can make appropriate use of functions provided by combinations of a plurality of appliances.

BRIEF DESCRIPTION OF THE DRAWINGS

FIG. 5 is a diagram showing one example of an appliance menu screen, according to the first exemplary embodiment;

FIG. 6 is a diagram showing one example of an instruction manual screen, according to the first exemplary embodiment;

FIG. 13 is a diagram showing one example of a function selection screen, according to a second exemplary embodiment;

DETAILED DESCRIPTION OF THE EMBODIMENTS

Figure 1:
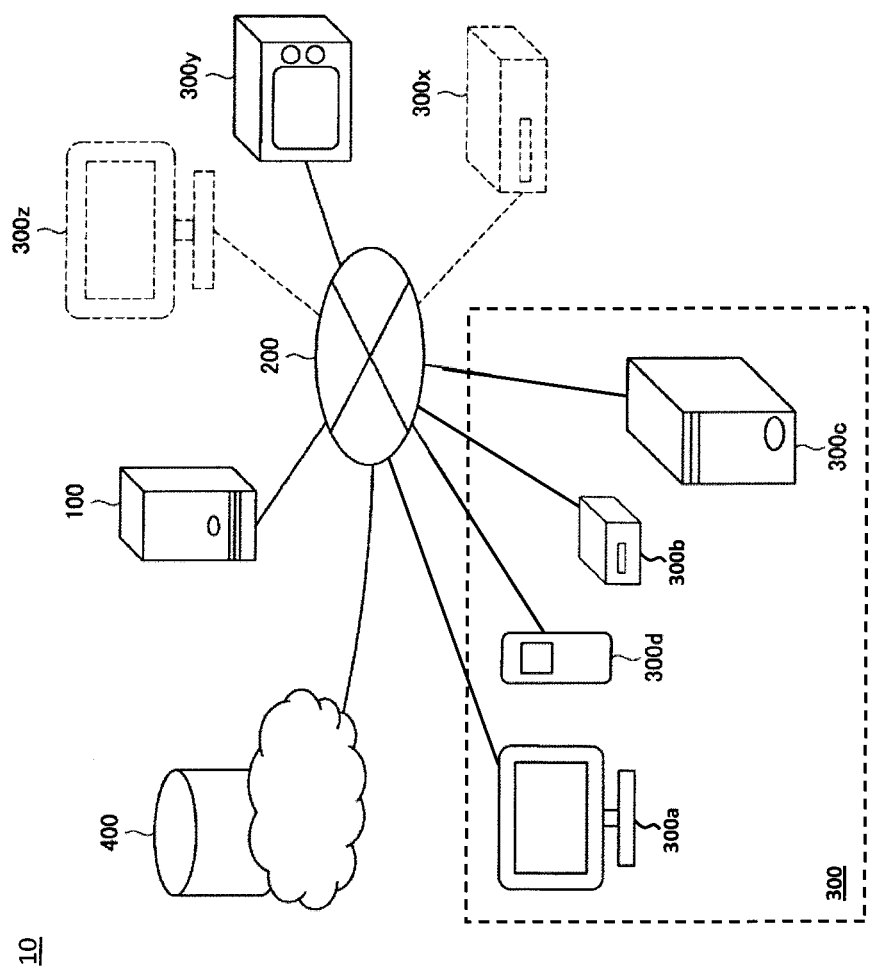
FIG. 1 is a diagram showing one example of the configuration of an information processing system, according to a first exemplary embodiment.

Hereinafter, exemplary embodiments will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. First Embodiment
 1-1. System Configuration
 1-2. Apparatus Configuration
 1-3. Processing Flow
 1-4. Examples of Display Screens
 1-5. Example of Evaluation and Recommendation for Content Playback Function
 1-6. Modification
2. Second Embodiment
3. Third Embodiment
4. Supplementary Information 1. First Embodiment
 1-1. System Configuration A first exemplary embodiment will now be described with reference to FIGS. 1 to 11. First, a system configuration according to a first exemplary embodiment will be described.

FIG. 1 is a diagram showing one example configuration of an information processing system 10 according to the first exemplary embodiment. As shown in FIG. 1, the information processing system 10 includes an information processing apparatus 100, a network 200, and a plurality of appliances 300 and a database 400 that are connected to the network 200.

The information processing apparatus 100 is connected to the network 200. The information processing apparatus 100 has a function that communicates via the network 200 with the appliances 300 and the database 400 and supports functions provided by combinations of specified appliances 300 out of the plurality of appliances 300 so that users can make appropriate use of such functions. Although the information processing apparatus 100 has been illustrated as a PC, the information processing apparatus 100 is not limited to a PC, and as another example, may be a dedicated server apparatus that is provided on a home network or an external network. The information processing apparatus 100 may have a user interface for receiving inputs of selections, instructions, and the like from a user or outputting information to the user, and may use a user interface of an appliances 300 via the network 200. Note that the configuration of the information processing apparatus 100 will be described later.

The network 200 connects the information processing apparatus 100, the appliances 300, and the database 400 to one another. The network 200 connects the information processing apparatus 100 and the appliances 300 set up in the home to one another using as examples, a LAN (Local Area Network) that is an IP network, USB, or HDMI. The network 200 also connects the database 400 provided on an external network and the information processing apparatus 100 via an Internet connection, for example.

A plurality of the appliances 300 (that is, a plurality of associated devices) are provided and each appliance 300 (that is, a associated device) can be used by a user. The appliances 300 include a television set 300a, a video recorder 300b, and NAS (Network Attached Storage) 300c that is are set up in the home, and a mobile terminal 300d. The appliances 300 may include all manner of appliances, such as an audio system, network media storage, and a networked hard-disk drive, that are capable of providing functions in combination with other appliances connected to the network. Any plural number of appliances 300 may be provided so that it is possible to combine the appliances 300, with the number of the appliances 300 not being limited to the illustrated example.

Here, as one example, the appliances 300 may be appliances that conform to DLNA (registered trademark). In DLNA (registered trademark), DMS (Digital Media Server) for storing content, DMP (Digital Media Player) for playing back content, DMR (Digital Media Renderer) for displaying content, M-DMU (Mobile Digital Media Uploader) for uploading content from a mobile device, M-DMD (Mobile Digital Media Downloader) that downloads content to a mobile device, and the like are defined as roles of respective appliances. For the example shown in FIG. 1, the NAS 300c functions as a DMS and by having the television set 300a operate as a DMP, a function for playing back video content stored in the NAS 300c on the television set 300a is provided to the user.

The database 400 is a database that is set up on an external network, for example in a server apparatus or the like. Information relating to the appliances 300 is stored in the database 400. More specifically, information such as an appliance type (television set, PC, mobile terminal, or the like), a model number, standalone function information, and linked function information is stored in the database 400. As examples, the linked function information includes function types (a video recording function, an image playback function, and the like), function names (character strings for displaying to the user), appliance types of linked devices, and information relating to connectivity (compatible protocols, i.e., whether appliances are compatible with DLNA (registered trademark), DTCP-IP (Digital Transmission Content Protection over Internet Protocol), AVC (Advanced Video Coding), HEAAC (High-Efficiency Advanced Audio Coding) and the like, for example). Such information that is stored in the database 400 may be registered by the manufacturer of the appliances 300, for example. By setting up the database 400 on an external network, it becomes easy to add information relating to new appliances 300 and to update the information relating to existing appliances 300.

1-2. Apparatus Configuration

The apparatus configuration according to the first exemplary embodiment will now be described with reference to FIG. 2.

Figure 2:
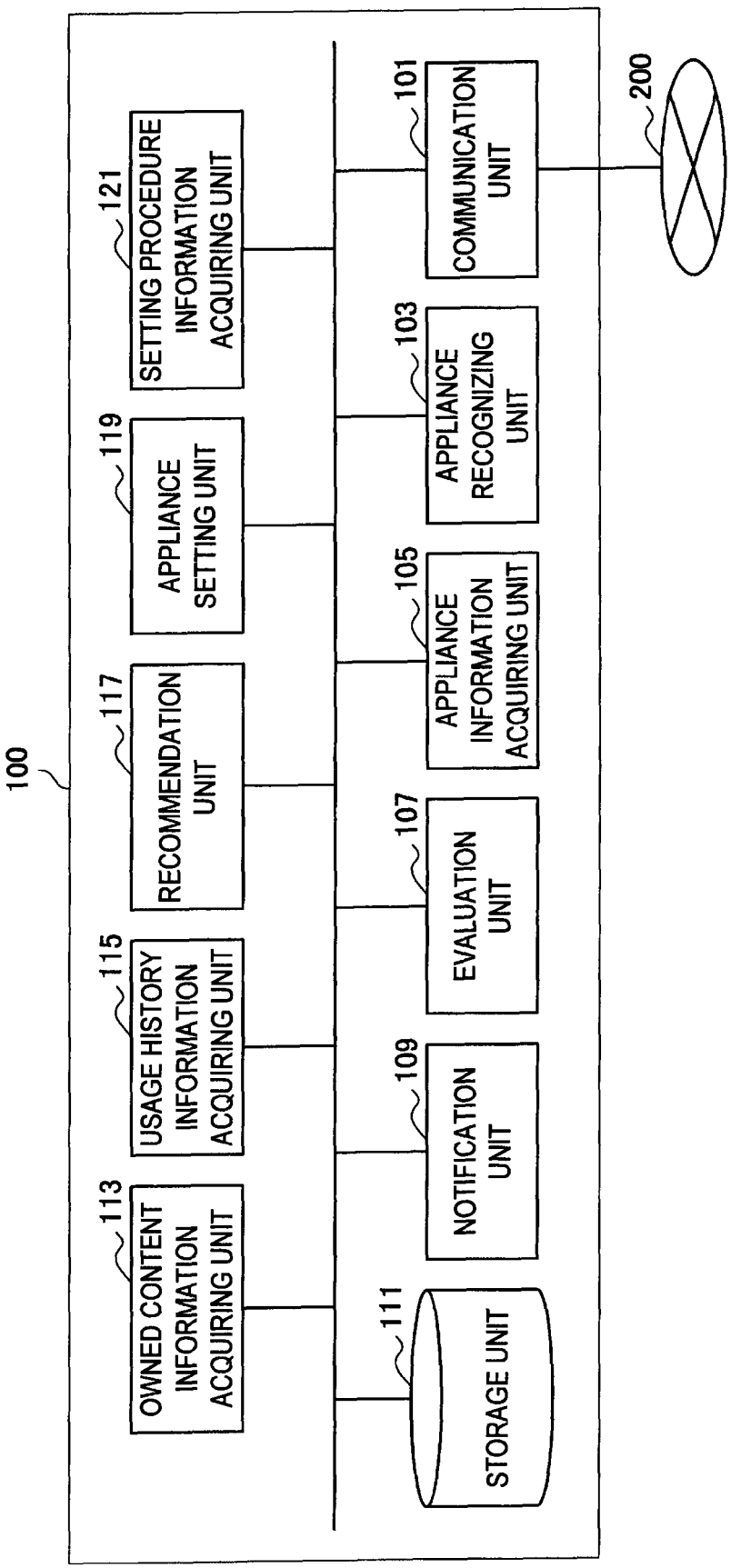
FIG. 2 is a block diagram showing one example of the configuration of an information processing apparatus, according to the first exemplary embodiment.

FIG. 2 is a block diagram showing an example configuration of the information processing apparatus 100 according to the first exemplary embodiment. As shown in FIG. 2, the information processing apparatus 100 includes a communication unit 101, an appliance recognizing unit 103, an appliance information acquiring unit 105, an evaluation unit 107, a notification unit 109, a storage unit 111, an owned content information acquiring unit 113, a usage history information acquiring unit 115, a recommendation unit 117, an appliance setting unit 119, and a setting procedure information acquiring unit 121.

Out of the functional component elements of the information processing apparatus 100 described above, the appliance recognizing unit 103, the appliance information acquiring unit 105, the evaluation unit 107, the notification unit 109, the owned content information acquiring unit 113, the usage history information acquiring unit 115, the recommendation unit 117, the appliance setting unit 119, and the setting procedure information acquiring unit 121 may be implemented as hardware using a circuit configuration that includes one or more integrated circuits, for example, or may be implemented as software by having a program stored in the storage unit 111 executed by a CPU (Central Processing Unit). The storage unit 111 is realized by combining storage apparatuses, such as a ROM (Read Only Memory) or RAM (Random Access Memory), or removable storage media, such as optical discs, magnetic disks, or semiconductor memory, as necessary.

The communication unit 101 communicates via the network 200 with the appliances 300. The communication unit 101 also communicates via the network 200 with the database 400. As examples, the communication unit 101 may be realized by a communication interface for a LAN as an IP network, or USB, or the like.

The appliance recognizing unit 103 recognizes the appliances 300 via the communication unit 101. More specifically, the appliance recognizing unit 103 communicates via the communication unit 101 with the appliances 300 connected to the network 200 and acquires information on the appliances 300 that can be used by the user. Note that it may be possible here for the user to use the respective appliances 300 themselves, and that it may also be possible for some or all of the functions provided by combinations of appliances 300 to not be useable. That is, according to the settings of the respective appliances 300, the functions provided by combinations of the appliances 300 may include functions that are not useable by the user at the present time. A search for information on the appliances 300 that can be used by users may be carried out using a protocol such as UPnP (Universal Plug and Play) for example, or a search may be carried out based on direct input of a manufacturer name, model number, serial number, and the like by the user. The appliance recognizing unit 103 also communicates via the communication unit 101 with the respective appliances 300 that can be used by the user and acquires information relating to the states of the respective appliances 300. One example of the information relating to the state of an appliance 300 is setting values and the like set in such appliance 300. The appliance recognizing unit 103 may store a list of the appliances 300 found by the search in the storage unit 111 as a list of appliances in the home. The appliance recognizing unit 103 may also store the states of the appliances 300 in association with the appliance list in the storage unit 111. In addition, the appliance recognizing unit 103 may notify the user of the list of found appliances 300 or the states of the appliances 300 via the notification unit 109.

For a combination of specified appliances 300 out of the appliances 300 (that is, a subset of the associated devices) recognized by the appliance recognizing unit 103, the appliance information acquiring unit 105 acquires information relating to functions provided to the user by such combination of the appliances 300 as appliance information. The appliance information acquiring unit 105 also acquires information relating to the performance of such combination of the appliances 300 described above as appliance information. As one example, the appliance information acquiring unit 105 may communicate via the communication unit 101 and the network 200 with the database 400 and acquire appliance information from the database 400. The appliance information acquiring unit 105 may also communicate via the communication unit 101 with the appliances 300 and acquire function information from the appliances 300. Here, as examples, the appliance information acquired by the appliance information acquiring unit 105 may include information such as an appliance type, a model number, standalone function information, linked function information, and the like. As examples, the linked function information may include function types, function names, appliance types of associated devices (that is, linked devices), and information relating to connectivity. The appliance information acquiring unit 105 may store the acquired information in the storage unit 111. In addition, the appliance information acquiring unit 105 may notify the user of the acquired appliance information via the notification unit 109.

Here, a "function" in the appliance information is an operation of the appliances 300 that provides some kind of user experience, such as "watch video", "listen to music", or "view photos" for example, and is also referred to as a "use case". As the information relating to the function "play video content", the appliance information includes information on a combination of appliances 300 that provide a function such as "provided by a combination of the television set 300a and the NAS 300c" or information on a function name to be displayed to the user such as "displayed using 'watch video' character string". As one example, the "performance of a combination of appliances 300" in the appliance information may be the performance when a function is provided by some combination of the plurality of appliances (that is, the subset of associated devices), such as "the combination of the television set 300a and the NAS 300c supports an AVC codec for playback of video content". As one example, when a content playback function is provided by a combination of certain appliances 300, format information on the content that can be played back or information on the power consumed by the respective appliances 300 may be acquired as the information on the performance of the combination of the appliances 300 in the appliance information. Note that the information included in the appliance information will be described later together with the relationship to the evaluations and recommendations made by the information processing apparatus 100.

The evaluation unit 107 evaluates one or both of a function and the performance of a combination of appliances 300 based on the appliance information acquired by the appliance information acquiring unit 105. The expression "evaluation" here refers to determining the value of a function or a combination of the appliances 300 based on usefulness and the like to the user, for example (that is, the generation of a value of a metric describing an execution of the function by the associated devices). Here, if the owned content information acquiring unit 113, described later, is provided, the evaluation unit 107 evaluates one or both of functions and the performance of combinations of the appliances 300 based also on owned content information acquired by the owned content information acquiring unit 113. Similarly, when the usage history information acquiring unit 115, described later, is provided, the evaluation unit 107 evaluates one or both of functions or the performance of combinations of the appliances 300 based also on usage history information acquired by the usage history information acquiring unit 115. Note that the function or a combination of appliances 300 evaluated by the evaluation unit 107 does not necessarily need to be usable by the user at the present time. That is, the evaluation unit 107 may evaluate functions or the performance of combinations of the appliances 300 that is not be used by the user at the present time due to settings of the respective appliances 300. The evaluation unit 107 may selectively focus on functions or combinations of the appliances 300 to be evaluated based on instructions from the user acquired via a user interface (not shown).

Here, the evaluation unit 107 evaluates one or both of the functions and the performance of the combinations of the appliances 300 in accordance with specified evaluation rules. As with "playback of video on a large screen is preferred", "playback of music on speaker system is preferred", or "playback using codecs with high image or audio quality is preferred", for example, evaluation rules may be decided so that functions or combinations of appliances 300 where a better user experience is expected are assigned higher evaluation scores (that is, higher values of the metrics). Such evaluation rules may be decided heuristically.

The evaluation rules may be decided based on information on the static performance of combinations of the appliances 300. For example, if the appliance information includes information on the power consumed by a combination of the appliances 300, the evaluation rules may be decided from a resource-use viewpoint so that devices with low power consumption are assigned higher evaluation scores. In this case, the evaluation unit 107 will assign a high evaluation value according to low power consumption as the performance of a combination of the appliances 300. Aside from the appliance information, the evaluation rules may also be decided based on the owned content information or the usage history information.

The evaluation rules may be generated from information produced by gathering evaluations or rating scores of other users who have already used such function or combination of the appliances 300 on a network. Such evaluation rules may be set in advance and stored in the storage unit 111, for example, or may be acquired from the database 400 on an external network. Note that examples of evaluation of functions and combinations of the appliances 300 are described later.

The notification unit 109 generates notification information including a result of evaluation by the evaluation unit 107. In addition to result of evaluation by the evaluation unit 107, as one example the notification information may further include a function or a combination of the appliances 300 specified by the recommendation unit 117 described later, and/or setting procedure information acquired by the setting procedure information acquiring unit 121, described later. In addition, the notification unit 109 outputs the generated notification information. The notification unit 109 may output the notification information as an image or may output notification information as a generated voice message. In addition, the notification unit 109 may notify the user of information relating to the appliances 300 recognized by the appliance recognizing unit 103 or the appliance information acquired by the appliance information acquiring unit 105. In such case, based on the provided information, the user may indicate the functions or combinations of appliances 300 to be selectively evaluated by the evaluation unit 107, for example.

Here, the notification unit 109 may output the notification information via one of the appliances 300, for example, the screen of the television set 300a, via the communication unit 101 or the network 200, for example. If the notification information is outputted via one of the appliances 300, the user is capable of easily acquiring the notification information during a series of operations on the appliances 300 being used.

Data that may be required for processing by the information processing apparatus 100 is stored in the storage unit 111. As examples, an appliance list that is information on the appliances 300 recognized by the appliance recognizing unit 103 may be stored in the storage unit 111 and appliance information acquired by the appliance information acquiring unit 105 may be stored in the storage unit 111. In addition, the results of evaluation by the evaluation unit 107 may be stored in the evaluation unit 107. In the storage unit 111, other data that has been acquired or generated by the information processing apparatus 100 may be temporarily or permanently stored. When various functions of the information processing apparatus 100 are implemented by software, a program that realizes such functions when executed by a CPU may be temporarily or permanently stored in the storage unit 111.

The owned content information acquiring unit 113 acquires user content information (that is, owned content information) relating to content owned by the user. The owned content information acquiring unit 113 is optionally provided in the information processing apparatus 100 in a case where functions including a playback function for content are evaluated by the evaluation unit 107. As one example, the owned content information acquiring unit 113 communicates via the communication unit 101 with the NAS 300c that operates as a DMS for DLNA (registered trademark) and acquires information relating to content stored in the NAS 300c as the owned content information. Here, as one example, the owned content information may include information on the number of content items owned by the user. The owned content information may also include format information for the content items owned by the user. By providing the owned content information acquiring unit 113, it becomes possible for the evaluation unit 107 to make more valid evaluations based on information on the content that is actually owned by the user.

The usage history information acquiring unit 115 acquires usage history information relating to the user's usage history of functions or combinations of the appliances 300. The usage history information acquiring unit 115 is optionally provided in the information processing apparatus 100 when it is desirable to evaluate functions or combinations of appliances 300 with consideration to the user's usage history. As one example, the usage history information acquiring unit 115 may communicate via the communication unit 101 with the respective appliances 300 and acquire usage history information stored in the respective appliances 300. More specifically, the usage history information acquiring unit 115 may acquire the usage history information by setting the respective appliances 300 so as to transmit the usage history information stored in the respective appliances 300 to the usage history information acquiring unit 115 of the information processing apparatus 100 on a regular basis, such as once a day. Here, as one example, the usage history information may include information on the usage frequency of functions or combinations of the appliances 300 by the user. By providing the usage history information acquiring unit 115, it becomes possible for the evaluation unit 107 to make more effective evaluations based on information on the actual usage history of functions and combinations of the appliances 300 by the user.

Based on the usage history information acquired by the usage history information acquiring unit 115 and the results of evaluation by the evaluation unit 107, the recommendation unit 117 specifies one or both of functions and combinations of the appliances 300 to be recommended to the user. The recommendation unit 117 is optionally provided in the information processing apparatus 100. The expression "recommendation" here refers for example to comparing evaluations by the evaluation unit 107 and usage states in the usage history information, specifying a particular function or combination of the appliances 300 that has not been used by the user in spite of being useful to the user, and recommending the specified function or combination to the user. As one example, the recommendation unit 117 may specify a function or combination of the appliances 300 that has not been used by the user out of the functions that have been assigned high evaluation scores by the evaluation unit 107. Also, the recommendation unit 117 may specify a function or a combination of the appliances 300 that has been assigned a high evaluation score by the evaluation unit 107 in spite of having a low usage frequency by the user. By providing the recommendation unit 117, the user is automatically presented with functions or combinations of appliances 300 that are especially useful, and by using the appliances in accordance with such recommendations, it becomes easier for the user to make use of functions provided by a combination of a plurality of appliances. Note that examples of recommendations of functions and combinations of the appliances 300 will be described later.

The appliance setting unit 119 automatically sets the respective appliances 300 via the communication unit 101 so that a function or combination of appliances 300 specified by the recommendation unit 117 can be used by the user. The appliance setting unit 119 is optionally provided in the information processing apparatus 100. As one example, when it is not possible for the user to use a recommended combination of appliances 300 at the present time, in accordance with a user instruction, the appliance setting unit 119 may change the settings of the respective appliances 300 by remote operation and thereby make it possible for the user to make use of the recommended combination of appliances 300. In addition, the appliance setting unit 119 may set the respective appliances 300 in accordance with an instruction made by the user to the information processing apparatus 100. By providing the appliance setting unit 119, it becomes possible for the user to easily use a recommended function or combination of the appliances 300.

The setting procedure information acquiring unit 121 acquires setting procedure information relating to a procedure that sets the appliances 300 so that a function or combination of appliances 300 specified by the recommendation unit 117 can be used by the user. The setting procedure information acquiring unit 121 is optionally provided in the information processing apparatus 100. As one example, when it is not possible for the user to use the recommended combination of appliances 300 at the present time, the setting procedure information acquiring unit 121 acquires setting procedure information of the respective appliances 300 in accordance with a user instruction. The setting procedure information may be acquired from the appliances 300 themselves via the communication unit 101, for example, or may be included in the appliance information acquired by the appliance information acquiring unit 105. In addition, the setting procedure information acquiring unit 121 may acquire the setting procedure information of the respective appliances 300 in accordance with an instruction made by the user to the information processing apparatus 100. By providing the setting procedure information acquiring unit 121, when it is not possible to automatically make settings using the appliance setting unit 119 due to security settings of the appliances 300 or the like, it will still be possible for the user to easily obtain information for using the recommended function or combination of the appliances 300.

1-3. Processing Flow

Next, the processing flow according to the first exemplary embodiment will be described with reference to FIG. 3.

Figure 3:
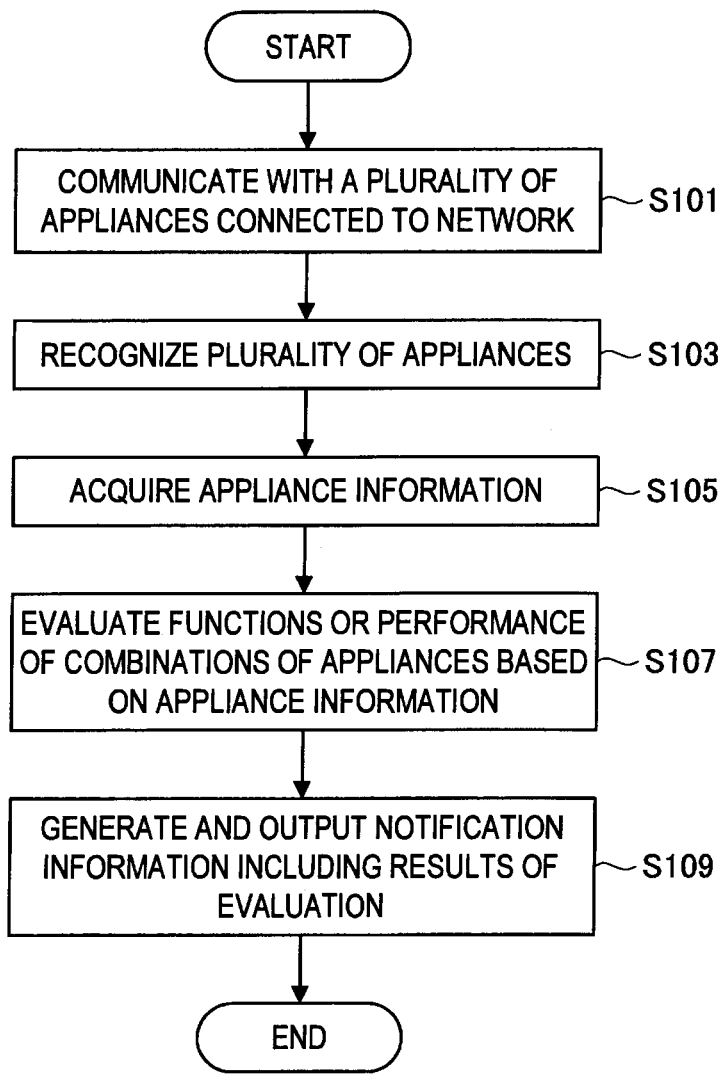
FIG. 3 is a flowchart showing one example of processing, according to the first exemplary embodiment.

FIG. 3 is a flowchart showing one example of processing according to the first exemplary embodiment. Note that the respective steps described below do not need to be executed by the information processing apparatus 100 and some or all of such steps may be executed by an apparatus aside from the information processing apparatus 100.

As shown in FIG. 3, first, the communication unit 101 communicates with the plurality of appliances 300 (that is, a plurality of associated devices) connected to the network 200 (step S101). Here, the communication unit 101 uses a protocol such as UPnP, for example. Note that the communication unit 101 may also communicate as necessary with the appliances 300 in subsequent steps so as to provide information that may be required by various units of the information processing apparatus 100.

Next, the appliance recognizing unit 103 recognizes the plurality of appliances 300 (step S103). Here, through the communication between the communication unit 101 and the plurality of the appliances 300 in step S101, the appliance recognizing unit 103 recognizes the appliances 300 that are connected to the network 200 and are capable of being used by the user. In addition, the appliance recognizing unit 103 communicates with the appliances 300 via the communication unit 101 and acquires information relating to the respective states of the appliances 300.

Next, the appliance information acquiring unit 105 acquires the appliance information (step S105). Here, the appliance information may include information relating to the functions provided by combinations of specified appliances 300 out of the appliances 300 recognized in step S103 and information relating to the performance of combinations of the appliances 300. As one example, the appliance information acquiring unit 105 acquires the appliance information by communication via the communication unit 101 with the database 400 or the appliances 300.

Next, the evaluation unit 107 evaluates functions or the performance of combinations of the appliances 300 based on the appliance information acquired in step S105 (step S107). Here, as optional configurations, before step S107, it is possible to execute a step where the owned content information acquiring unit 113 acquires the owned content information or a step where the usage history information acquiring unit 115 acquires the usage history information. In such case, in step S107, the evaluation unit 107 evaluates functions or the performance of combinations of the appliances 300 based also on the owned content information or the usage history information.

Next, the notification unit 109 generates and outputs notification information including the results of the evaluation in step S107 (step S109). Here, as an optional configuration, a step where the recommendation unit 117 specifies functions or combinations of appliances 300 to be recommended to the user may be executed between step S107 and step S109. In this case, in step S109, the notification unit 109 generates notification information that further includes a function or combination of appliances 300 specified by the recommendation unit 117 and is outputted via the screen of the television set 300*a*, for example.

In addition, as an optional configuration, a step where the appliance setting unit 119 automatically sets, in accordance with an instruction from the user, the appliances 300 via the communication unit 101 so that it becomes possible for the user to use a function or combination of the appliances 300 may be executed after step S109. Alternatively, a step where the setting procedure information acquiring unit 121 acquires, in accordance with a user instruction, setting procedure information relating to a procedure for setting the appliances 300 so that a function or combination of the appliances 300 can be used by the user may be executed. In this case, a further step is then executed where the notification unit 109 generates notification information that also includes the setting procedure information and outputs the notification information via the screen of the television set 300*a*, for example.

1-4. Examples of Display Screens

Next, examples of display screens according to the first exemplary embodiment will be described with reference to FIGS. 4 to 11. The example display screens described below are displayed based on an output of the notification unit 109 of the information processing apparatus 100. As one example, such example display screens may be displayed by an appliance 300 (for example, on a display unit of the television set 300*a*) connected via the network 200 to the information processing apparatus 100, and/or may be displayed on a display unit included in a user interface of the information processing apparatus 100. Here, it is assumed that the apparatus that displays the example display screens includes an input apparatus such as a keyboard, mouse, or touch panel, for example, and is capable of acquiring a selection or instruction made by the user in response to the displayed screen.

Figure 4:
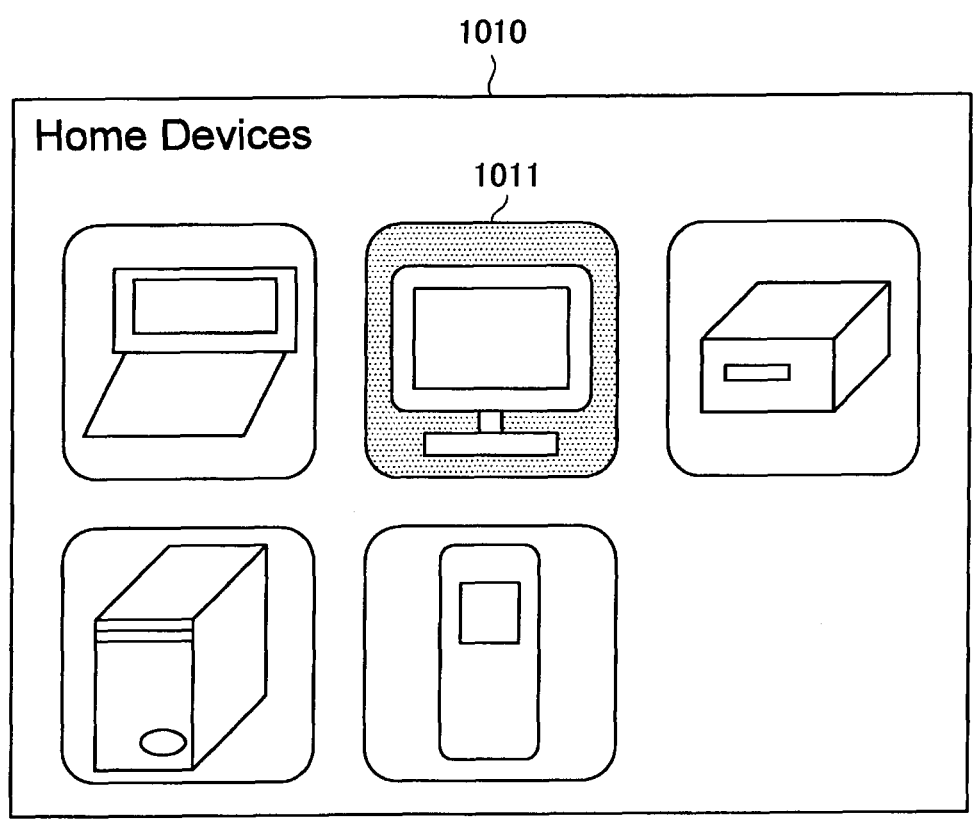
FIG. 4 is a diagram showing one example of an appliance selection screen, according to the first exemplary embodiment.

FIG. 4 is a diagram showing one example of an appliance selection screen 1010. The appliance selection screen 1010 is displayed first by the information processing apparatus 100. The appliance selection screen 1010 is generated using information on the appliances 300 recognized by the appliance recognizing unit 103 of the information processing apparatus 100. In the appliance selection screen 1010, appliance icons 1011 that display the recognized appliances 300 are displayed. Here, a PC, a television set, a video recorder, NAS, and a mobile terminal are displayed as examples of the appliance icons 1011. By selecting one of the appliance icons 1011 in the appliance selection screen 1010, the user is capable of obtaining information relating to an appliance 300 that can be used via the network 200. Here, when the appliance icon 1011 representing the television set 300*a* has been selected, the screen shown in FIG. 5 is displayed.

Figure 10:
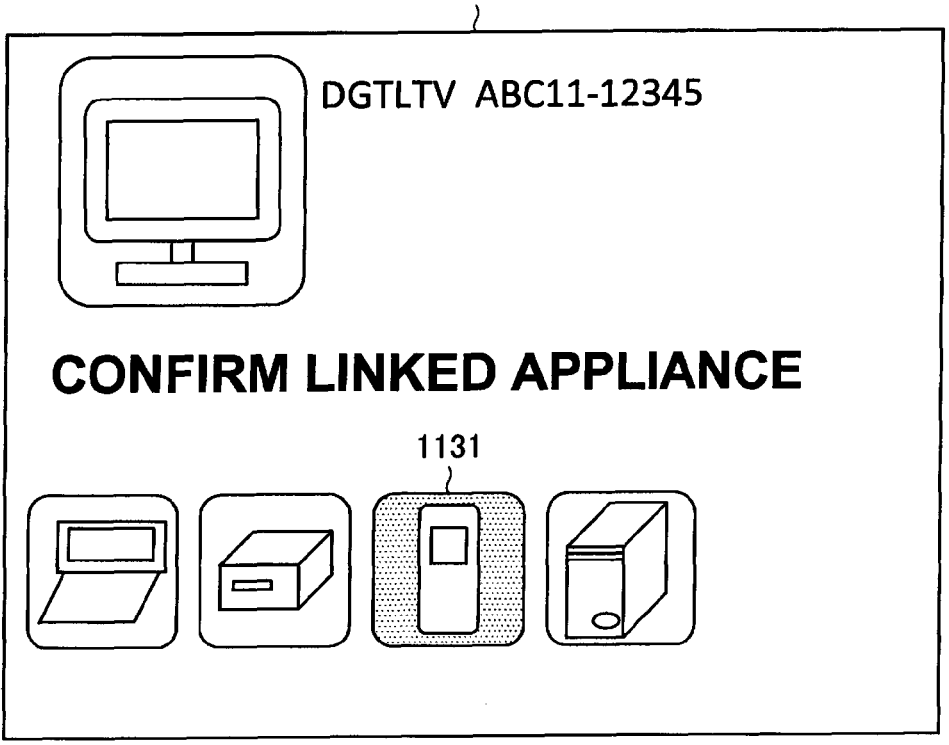
FIG. 10 is a diagram showing one example of a linked appliance selecting screen, according to the first exemplary embodiment.

FIG. 5 is a diagram showing one example of an appliance menu screen 1030. The appliance menu screen 1030 is generated using appliance information acquired by the appliance information acquiring unit 105 of the information processing apparatus 100. Information is displayed in the appliance menu screen 1030 using an icon, a model number, and standalone function information included in the appliance information of the television set 300*a*. Here, the information displayed according to the standalone function information is given in the form of links. When "Play Content", "Transfer Screen", and "Change Appliance Settings" have been selected, it is possible to operate standalone functions of the television set 300*a* according to remote operation from the information processing apparatus 100. When "Instruction Manual" has been selected, the screen shown in FIG. 6 is displayed. When "Confirm Linked Appliance" has been selected, the screen shown in FIG. 10 is displayed.

FIG. 6 is a diagram showing one example of an instruction manual screen 1050. The instruction manual screen 1050 is generated using the appliance information acquired by the appliance information acquiring unit 105 of the information processing apparatus 100. Standalone function information and linked function information included in the appliance information of the television set 300*a* are displayed in the instruction manual screen 1050. Here, "Watch TV" as standalone function information of the television set 300*a* and "Control Connected Appliance" and "Play Content from Network Appliance" are respectively displayed as linked function information of the television set 300*a*. When "Watch TV" has been selected, it is possible to start watching a television program on the television set 300*a*. When "Control Connected Appliance" has been selected, it is possible to use the appliance setting unit 119 of the information processing apparatus 100 to remotely control another appliance 300 connected to the television set 300*a*. When "Play Content from Network" has been selected, the screen shown in FIG. 7 is displayed.

Figure 7:
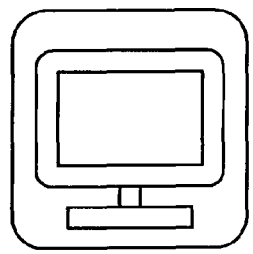
FIG. 7 is a diagram showing one example of a linked function menu screen, according to the first exemplary embodiment.

FIG. 7 is a diagram showing one example of a linked function menu screen 1070. The linked function menu screen 1070 is generated using the appliance information acquired by the appliance information acquiring unit 105 of the information processing apparatus 100. In the linked function menu screen 1070, the function names "Watch Video", "Listen to Music" and "View Photos" included in the linked function information acquired by the appliance information acquiring unit 105 are displayed. The screen displayed when "Watch Video" has been selected out of such functions will now be described with reference to FIG. 8.

Figure 8:
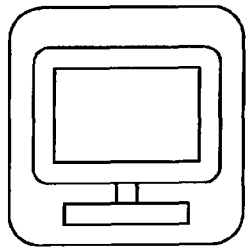
FIG. 8 is a diagram showing one example of a linked function details menu screen, according to the first exemplary embodiment.

FIG. 8 is a diagram showing one example of a linked function details menu screen 1090. The linked function details menu screen 1090 is generated using the appliance information acquired by the appliance information acquiring unit 105 of the information processing apparatus 100. When "Operation Method" has been selected in the linked function details menu screen 1090, the operation method for watching video content from a network appliance that has been acquired by the setting procedure information acquiring unit 121 of the information processing apparatus 100 is displayed. Also, when "Help" has been selected, contact information for the manufacturer of the appliance 300 included in the appliance information is displayed. When "Function Details" has been selected, the screen shown in FIG. 9 is displayed.

Figure 9:
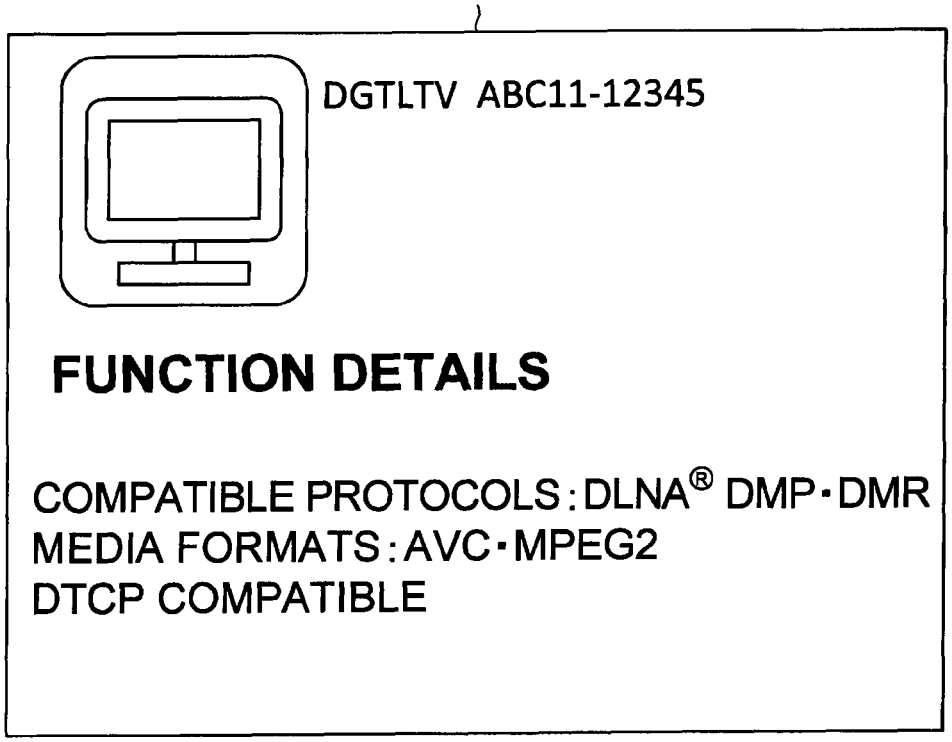
FIG. 9 is a diagram showing one example of a linked function details screen, according to the first exemplary embodiment.

FIG. 9 is a diagram showing one example of a linked function details screen 1110. The linked function details screen 1110 is generated using the appliance information acquired by the appliance information acquiring unit 105 of the information processing apparatus 100. In the linked function details screen 1110, out of the appliance information, "Compatible Protocols", "Media Formats" and "DTCP Compatible" are displayed using the information relating to connectivity that is included in the linked function information. From the display of "Compatible Protocols", it is possible for the user to know that the television set 300a is capable of operating as a DMP or as a DMR according to DLNA (registered trademark) standard. Similarly, from the display of "Media Formats", it is possible for the user to know that the television set 300a is compatible with AVC and MPEG2 (Moving Picture Experts Group phase 2) formats. In addition, from the display of "DTCP Compatible", it is possible for the user to know that the television set 300a is compatible with playback of content protected by copyright protection technology.

FIG. 10 is a diagram showing one example of a linked appliance selecting screen 1130. The linked appliance selecting screen 1130 is displayed when "Confirm Linked Appliance" has been selected in the appliance menu screen 1030 described with reference to FIG. 2. The linked appliance selecting screen 1130 is generated using the appliance information acquired by the appliance information acquiring unit 105 of the information processing apparatus 100. In the linked appliance selecting screen 1130, linked appliance icons 1131 are displayed using information on appliance types of associated, that is linked, devices that is included in the linked function information out of the appliance information. The linked appliance icons 1131 of the PC, video recorder, mobile terminal, and NAS displayed here inform the user that some functions are provided by combining the television set 300a with one out of such appliances. Here, when the linked appliance icon 1131 representing the mobile terminal 300d has been selected by the user, the evaluation unit 107 of the information processing apparatus 100 evaluates functions provided by a combination of the television set 300a and the mobile terminal 300d and displays the screen shown in FIG. 11.

Figure 11:
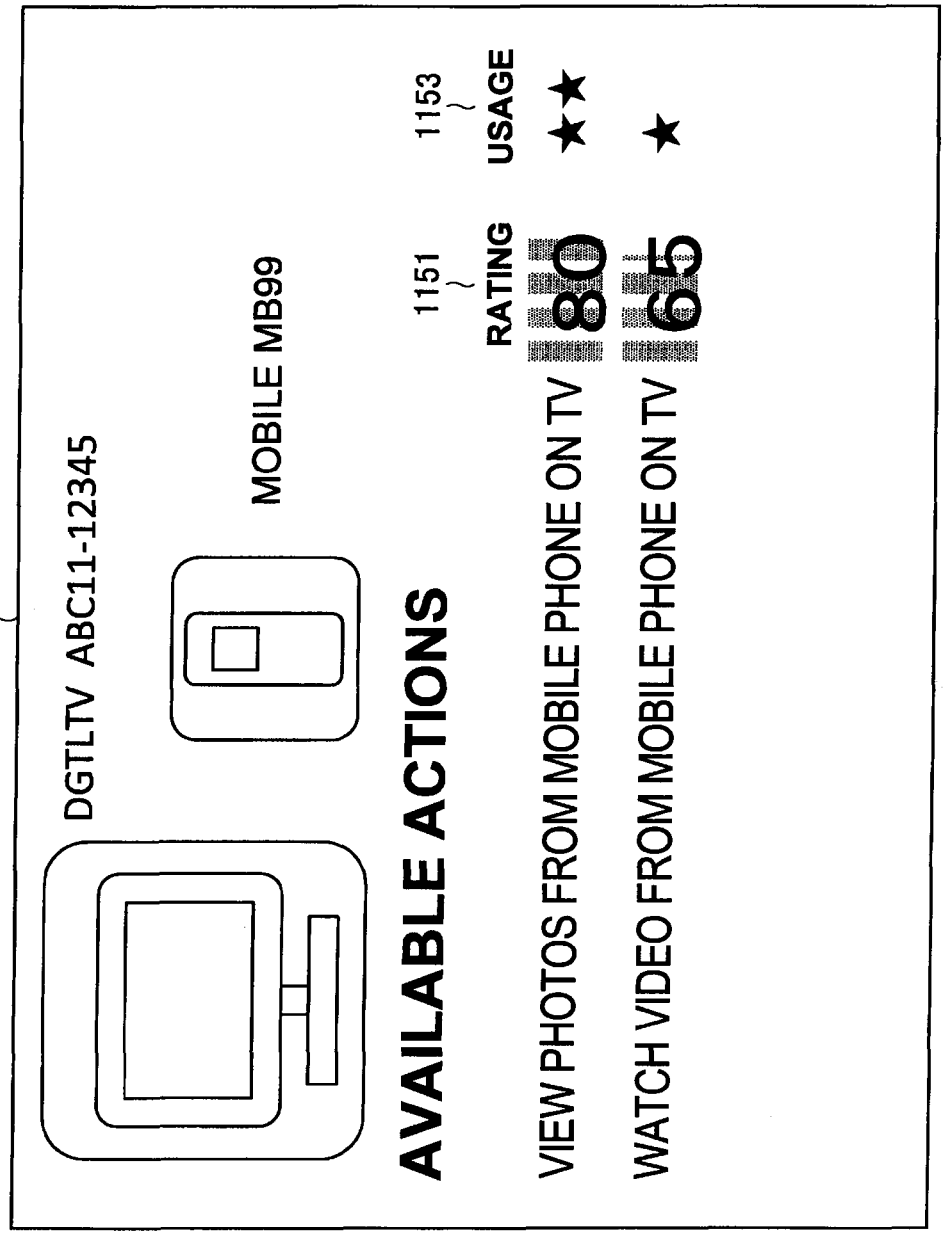
FIG. 11 is a diagram showing one example of a function evaluation screen, according to the first exemplary embodiment.

FIG. 11 shows one example of a function evaluation screen 1150. The function evaluation screen 1150 is generated using the notification information generated by the notification unit 109 and includes results of evaluation by the evaluation unit 107 of the information processing apparatus 100. In the function evaluation screen 1150, the combination of the appliances 300 is fixed, and therefore the screen is characterized by displaying results of evaluation of the functions of such combination of the appliances 300.

Here, an example where the evaluation unit 107 has evaluated the two functions "play image content" and "play video content" is shown. In the function evaluation screen 1150, the two functions are displayed using function names for displaying to the user that are included in the appliance information, such names being "view photos from mobile phone on TV" and "watch video from mobile phone on TV". In the function evaluation screen 1150, a points display 1151 is displayed corresponding to each of the functions. The numeric values in the points display 1151 are numeric values that reflect the results of evaluation by the evaluation unit 107. When a function or combination of appliances 300 specified by the recommendation unit 117 is also included in the notification information, the numeric value of the points display 1151 for such function or combination of appliances 300 specified by the recommendation unit 117 is set higher. To visually inform the user of the results of evaluation or recommendation, the points display 1151 may be displayed using a graph, a number of stars, or the like in addition to or in place of the display of a numeric value. It is also possible for the points display 1151 to be given a title, such as "rating", showing that such function has been evaluated or recommended.

Also, optional information such as a usage frequency display 1153 or the like may be displayed in the function evaluation screen 1150. The usage frequency display 1153 is displayed based on the usage history information acquired by the usage history information acquiring unit 115. The usage frequency display 1153 displays the frequency with which the user has used the respective functions by way of a number of stars. The usage frequency display 1153 is not limited to a number of stars and may be a numerical display or a graph display. In addition to or in place of the usage frequency display 1153, it is possible to display other optional information such as the number of content items played back by the respective functions based on the owned content information acquired by the owned content information acquiring unit 113.

In addition, when a function or combination of appliances 300 specified by the recommendation unit 117 is included in the notification information, it is possible to show in the function evaluation screen 1150 that such function or combination of the appliances 300 has been recommended. For example, by highlighting the points display for a function or the combination of appliances 300 specified by the recommendation unit 117 in the function evaluation screen 1150, such as by making the points display flash, it is possible to show that such function or combination of the appliances 300 has been recommended.

1-5. Example of Evaluation and Recommendation for Content Playback Function

The functioning of the evaluation unit 107 and the recommendation unit 117 of the information processing apparatus 100 according to the first exemplary embodiment described above will now be described further for an example where the function provided by a combination of a plurality of the appliances 300 is a content playback function. Here, the expression "content" refers to any content such as images, video, or music, for example. In this example, the expression "content playback function" refers to functions such as viewing image content stored in the NAS 300c on the mobile terminal 300d or watching video content stored in the video recorder 300b on the television set 300a. For a content playback function, since the optimal combination of appliances is decided by a number of factors such as the format of the content and the number of content items owned by the user, information that supports optimal use of the functions provided by combinations of appliances is especially useful.

Evaluation According to Appliance Information

The evaluation unit 107 may evaluate the content playback function based on information on static performance of the respective appliances 300 included in the appliance information acquired by the appliance information acquiring unit 105. Here, the evaluation rules may include evaluation of the format of the content. As the performance of a combination of the appliances 300, the evaluation unit 107 may assign a higher evaluation score to the ability to playback more advanced formats. For example, for a playback function for video, compared to a combination of the appliances 300 that can handle only MPEG2 format, a combination of the appliances 300 that can handle AVC format that has a higher compression ratio is considered as being able to play back video with higher quality and provide a better user experience. In such case, by deciding evaluation scores in the evaluation rules in accordance with the formats that can be played back, as in "MPEG2 playback=40" and "AVC playback=80", it is possible to assign evaluation scores so that the more advanced the formats that can be played back, the higher the evaluation score. Also, aside from a quantitative index such as compression ratio, it is also possible to assign a higher evaluation score to compatibility to formats required for specified uses, such as DTCP-IP that is required when handling content for digital broadcasts.

The evaluation rules may also include optional functions for the content playback function or advanced evaluation that considers actual implementation. As the performance of a combination of appliances 300, the evaluation unit 107 may assign higher evaluation scores to the ability to use optional functions, such as the ability to delete content after playback or the ability to rotate an image. Also, as another example, the evaluation unit 107 may assign a higher evaluation score to a combination of a mobile terminal and a server that provides image content having resized the images in accordance with the screen size of an apparatus (such as a television set or mobile terminal) used to display such images. Here, as one example of advanced evaluation considers actual implementation, the time taken to display content at a mobile terminal will be reduced if the image content has been resized in advance.

Evaluation Using Owned Content Information or Usage History Information

The evaluation unit 107 may make evaluations relating to a content playback function based also on the owned content information acquired by the owned content information acquiring unit 113. In such case, the evaluation rules may include evaluation of the ownership of content by the user. As the performance of a combination of the appliances 300, the evaluation unit 107 may assign a higher evaluation score when a larger number of reproducible content items are owned by the user. For example, when it is known from the owned content information that the user does not own any content that requires a WMV (Windows (registered trademark) Media Video) codec, the evaluation unit 107 does not need to assign different evaluation scores to a combination of appliances 300 that is not compatible with the WMV codec and a different combination of appliances 300 that is compatible with the WMV codec. On the other hand, when it is known from the owned content information that the user owns digital broadcast content that requires DTCP-IP only, the evaluation unit 107 may assign an extremely low evaluation score to a combination of the appliances 300 that is not compatible with DTCP-IP.

The evaluation unit 107 may evaluate the content playback function further based on the usage history information acquired by the usage history information acquiring unit 115. In this case, the evaluation rules may include evaluation of the usage history of content. As the performance of a combination of the appliances 300, the evaluation unit 107 may assign a higher evaluation score to the ability to playback content that is played back very frequently. For example, when it is known from the usage history information that the user frequently watches digital broadcast content that requires DTCP-IP, the evaluation unit 107 may assign a higher evaluation score to a combination of the appliances 300 that is compatible with DTCP-IP.

In addition, the evaluation unit 107 may evaluate the content playback function in accordance with the owned content information and the usage history information. As one example, when it is known from the owned content information and the usage history information that the user owns many photographs that are image content and frequently views such photographs, the evaluation unit 107 may assign a high evaluation score to a function that plays back such image content.

Evaluation Using a Plurality of Information

The appliance information, the owned content information, and the usage history information are information that can be used when the evaluation unit 107 evaluates a function or a combination of the appliances 300. The evaluation unit 107 may extract a plurality of parameters showing different types of value or different evaluations from such information and carry out evaluation based on a combination of information by multiplying the respective parameters. As one example, consider a case where, for the example of the display screen described with reference to FIG. 11, the evaluation unit 107 evaluates two functions "play photos" and "play movies" in accordance with a combination of the appliance information, owned content information, and usage history information.

First, the evaluation unit 107 calculates appliance evaluation scores for two functions based on the appliance information. Evaluation using the appliance information has been described earlier and therefore no detailed description will be given here. Assume that the evaluation here results in appliance evaluation scores of 100 being assigned to "play photos" and 97 being assigned to "watch video".

The evaluation unit 107 also calculates owned content evaluation scores for the two functions based on the owned content information. As one example, assume that the ratio of the respective numbers of content items stored in a mobile telephone for photographs and movies is 3:2. In this case, a function for which the user owns a larger number of content items that can be played back is assigned a higher evaluation score by the evaluation unit 107, and therefore owned content evaluation scores of 1.00 and 0.67 are respectively assigned to "play photos" and "watch video".

The evaluation unit 107 also calculates the usage history evaluation scores of the two functions based on the usage history information. Here, as one example, assume that the ratio of the frequency with which the user views photos on a television set to the frequency with which the user watches videos on the television set is 4:5 for example. In this case, since a function with a higher usage frequency is assigned a higher evaluation score, the evaluation unit 107 assigns usage history evaluation scores of 0.80 and 1.00 respectively to "play photos" and "watch video".

Here, the evaluation unit 107 calculates the evaluation scores of the two functions by multiplying the appliance evaluation score, the owned content evaluation scores, and the usage history evaluation scores. That is, the evaluation score of "play photos" is 100×1.00×0.80=80 and the evaluation score of "watch video" is 97×0.67×1.00=65.

In this way, by carrying out evaluation by combining a plurality of information, it is possible for the user to obtain information on evaluations that reflect overall conditions regarding the use of functions provided by a combination of a plurality of appliances, which makes it easy for the user to make appropriate use of the functions provided by combinations of the appliances 300.

Aside from the examples described above, by multiplying the evaluation score of a function and the evaluation score for the performance of a combination of the appliances 300 that provide such function, for example, it is possible to make an overall evaluation of a function and a combination of the appliances 300. As one example, assume that the evaluation score for the function "view photos" is 80. Here, when there are two combinations of the appliances 300 for viewing photos, namely the "NAS 300c and the television set 300a" combination and the "NAS 300c and the mobile terminal 300d" combination, the evaluation unit 107 may calculate overall evaluation scores by multiplying the evaluation score of the function "view photos" by the respective evaluation scores of such combinations of the appliances 300.

As one example, assume that the ratio of the power consumption for a case where "view photos" is carried out by the "NAS 300c and the television set 300a" combination to a case where "view photos" is carried out by the "NAS 300c and the mobile terminal 300d" combination is 5:2. In this case, a higher evaluation score is assigned to lower power consumption, and therefore the evaluation unit 107 assigns evaluation scores of 0.40 and 1.00 respectively to "the NAS 300c and the television set 300a" and "the NAS 300c and the mobile terminal 300d" combinations. As a result, the evaluation score for "view photos using the NAS 300c and television set 300a combination" is 80×0.40=32 and the evaluation score for "view photos using the NAS 300c and mobile terminal 300d combination" is 80×1.00=80.

In this way, by multiplying the evaluation score for a function by the evaluation score for the appliances 300, it is possible for the user to easily grasp both an evaluation of "which functions are useful" and an evaluation of "which combination of appliances is most effective for using such function" from a single numeric value, which makes it easy for the user to make appropriate use of the functions provided by combinations of the appliances 300.

Recommendations Based on Usage History Information and Evaluation Results

The recommendation unit 117 specifies one or both of functions to be recommended to the user and combinations of the appliances 300 based on the usage history information acquired by the usage history information acquiring unit 115 and the results of evaluation by the evaluation unit 107. The recommendation unit 117 may specify a function or a combination of the appliances 300 as a recommended function or combination when a usage frequency in the usage history information is below a specified threshold regardless of whether or not the evaluation score calculated by the evaluation unit 107 is above a specified threshold. For example, when a large number of photographs are stored in the NAS 300c and the frequency of viewing such photographs on the mobile terminal 300d is high, the evaluation unit 107 will assign the function "view photos" a high evaluation score, with such evaluation score exceeding a specified threshold. Meanwhile, assume that out of the combinations of the appliances 300 that provide the function "view photos", the combination of the NAS 300c and the television set 300a has a low usage frequency in the usage history information, with such evaluation score falling below a specified threshold for the usage frequency. Also assume that as the evaluation score assigned by the evaluation unit 107 to the performance of the combinations of the appliances 300 that provide the function "view photos", the evaluation score of the "NAS 300c and television set 300a" combination is higher than the evaluation score of the "NAS 300c and mobile terminal 300d" combination. In this case, the recommendation unit 117 presumes that in spite of often using the "view photos" function, the user has not noticed that the "NAS 300c and television set 300a" combination that has high performance is capable of such function, and makes a "view photos on the NAS 300c and television set 300a combination" recommendation to the user.

In this way, by recommending a combination of the appliances 300 that has a low usage frequency in spite of having a high evaluation score for a function that has a high evaluation score, it is possible to make the user aware of a combination of appliances that the user has not noticed in spite of being useful to the user and thereby encourage the user to make appropriate use of a function provided by a combination of the appliances 300.

1-6. Modification

Figure 12:
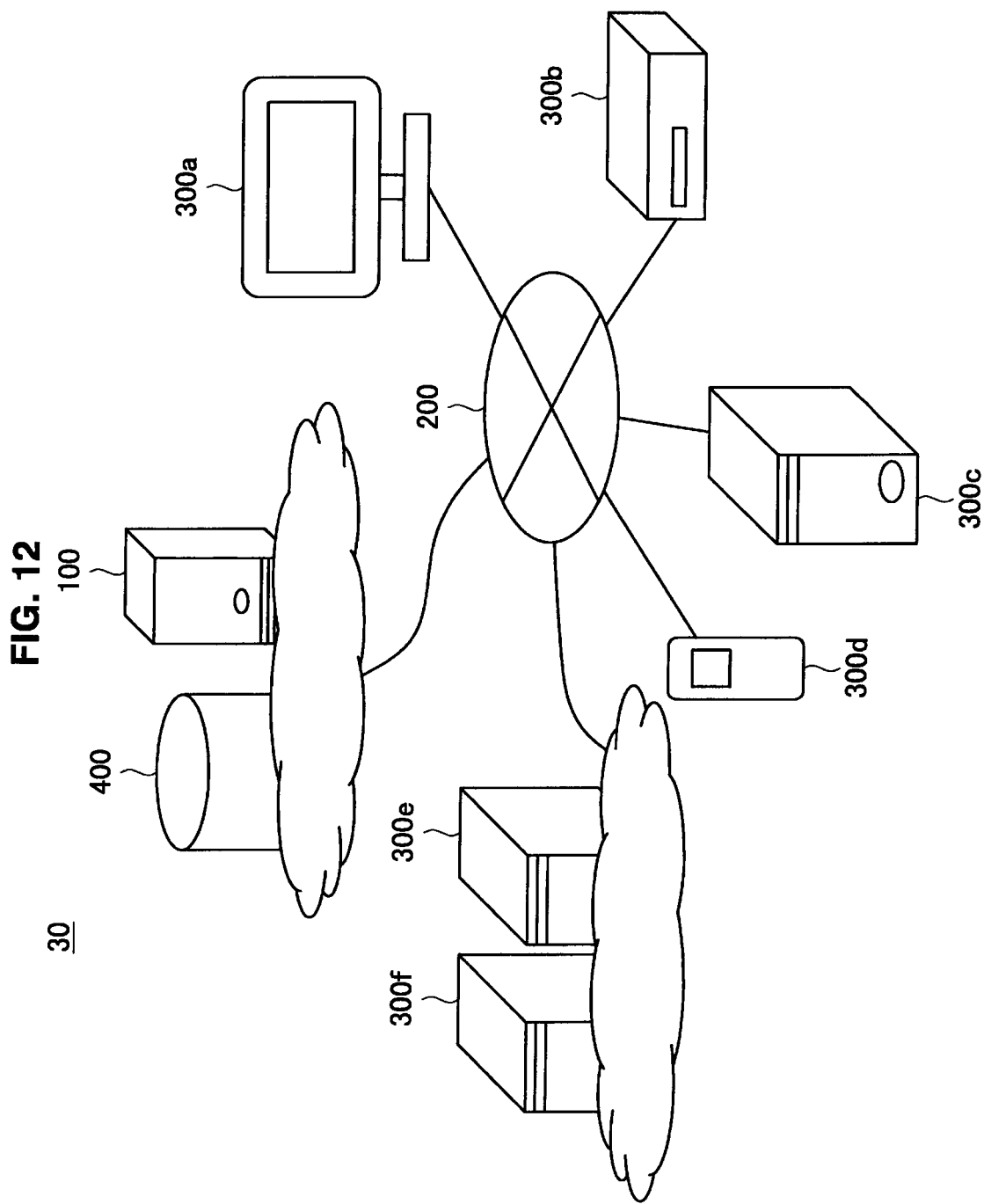
FIG. 12 is a diagram showing a modification to the information processing system, according to the first exemplary embodiment.

A modification to the information processing system 10 according to the first exemplary embodiment will now be described with reference to FIG. 12. FIG. 12 is a diagram showing a modification to the information processing system 10. As shown in FIG. 12, in this modification, Web service servers 300e, 300f on an external network are included in the appliances 300. As examples, the Web service servers 300e, 300f provide Web services such as a video sharing service and an instant messaging service. The information processing apparatus 100 is also provided as an application server, for example, on the external network.

Here, the user uses a user interface of one of the television set 300a, the video recorder 300b, the NAS 300c, and the mobile terminal 300d, accesses the information processing apparatus 100 on the external network, and uses functions of the information processing apparatus 100 such as by using an application, for example. If the user has an account on the Web services described above, the Web service servers 300e, 300f can be treated as appliances that are connected to the network 200 and can be used by the user in the same way as the other appliances 300. In this case, the functions provided by combinations of the appliances 300 include functions provided by the Web services, such as viewing video content provided by a combination of the television set 300a and the Web service server 300e and an instant messaging service provided by a combination of the mobile terminal 300d and the Web service server 300f, for example.

The evaluation unit 107 may evaluate the performance of a combination of appliances 300 based on the state of a user's account on a Web service. As one example, there will be cases where the user has a billed account for a download service for content on the Web service server 300e (so that high-speed downloading is possible) but does not have a billed account for a download service for content on the Web service server 300f (so that high-speed downloading is not possible). In such case, for a content download function, the evaluation unit 107 may assign a higher evaluation score to the performance of the combination of the television set 300a and the Web service server 300e than to the performance of the combination of the television set 300a and the Web service server 300f.

In addition, the setting procedure information acquired by the setting procedure information acquiring unit 121 may include operation of an account on a Web service. For example, when it is not possible at the present time to make use of a high-speed download service for content, the procedure for changing an account on a Web service to a billed account may be included in the setting procedure information.

2. Second Embodiment

A second exemplary embodiment will now be described with reference to FIGS. 13 and 14. Note that although the screen displays in the second exemplary embodiment differ compared to the first embodiment (that was described with reference to FIGS. 4 to 11), since the other functional configuration is substantially the same as the first embodiment, detailed description thereof is omitted.

FIG. 13 is a diagram showing one example of a function selection screen 1170 that is displayed first by the information processing apparatus 100 according to the second exemplary embodiment. The function selection screen 1170 is generated using the appliance information acquired by the appliance information acquiring unit 105 of the information processing apparatus 100. In the function selection screen 1170, functions provided by combining specified appliances out of the appliances connected via the network 200 to the information processing apparatus 100 are displayed in a list. A screen displayed when "view photos" has been selected out of such functions will now be described with reference to FIG. 14.

Figure 14:
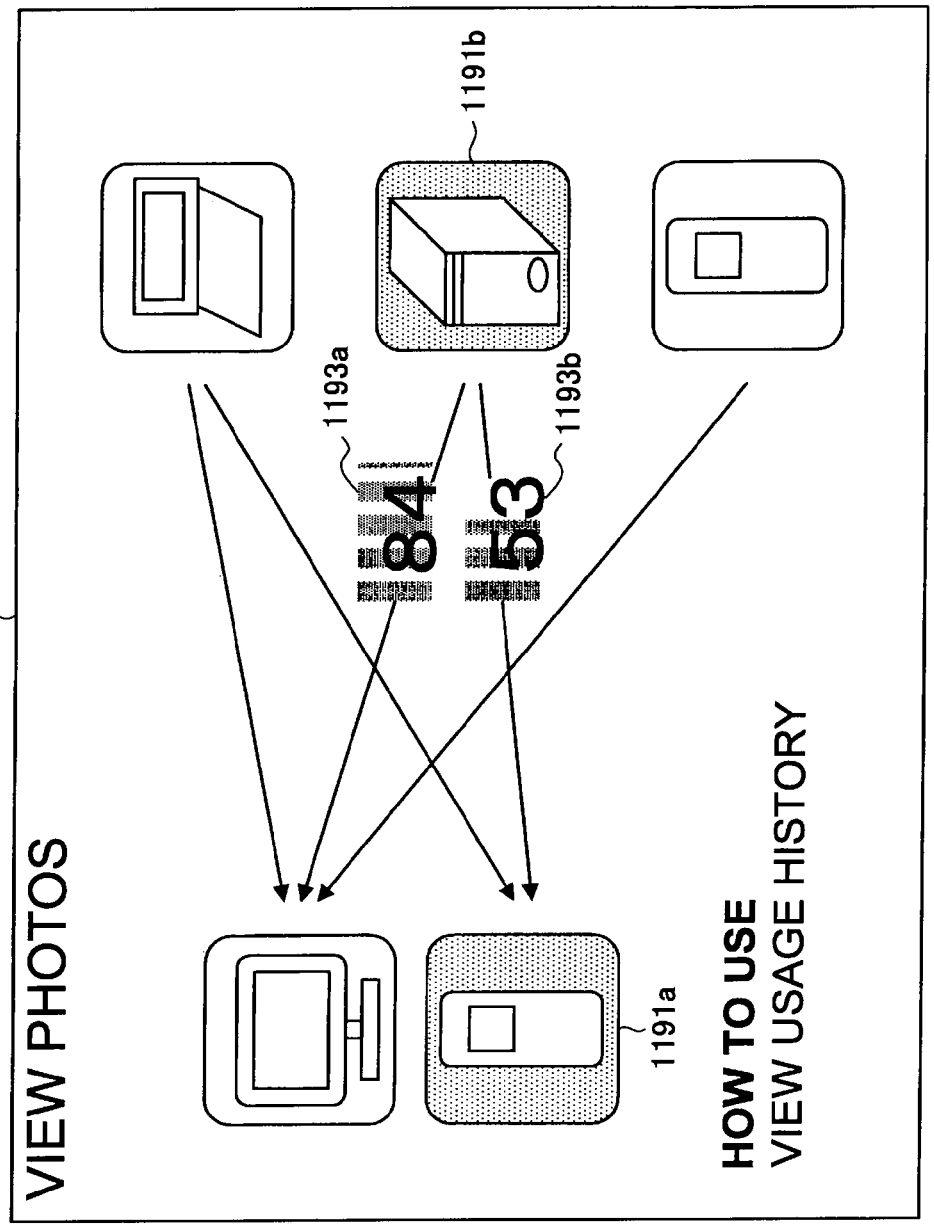
FIG. 14 is a diagram showing one example of a combination evaluation screen, according to the second exemplary embodiment.

FIG. 14 is a diagram showing one example of a combination evaluation screen 1190. The combination evaluation screen 1190 includes the results of evaluation by the evaluation unit 107 of the information processing apparatus 100 and is generated using the notification information generated by the notification unit 109. The combination evaluation screen 1190 has a characteristic in that the function provided by combinations of the appliances 300 is fixed and the evaluation results for combinations of appliances 300 that provide such function are displayed.

Here, an example where the evaluation unit 107 has evaluated a plurality of combinations of appliances 300 that provide the function "play image content" is illustrated. In the combination evaluation screen 1190, the function is displayed using the function name for display to the user, that is, "view photos", included in the appliance information.

In the combination evaluation screen 1190, the appliances 300 that can be included in combinations for providing such function are displayed by icons with shapes in accordance with the roles of the respective appliances. As one example, when the appliances 300 conform to DLNA (registered trademark), appliances that can operate as a DMP or a DMR, for example, a television set and a mobile terminal, are displayed in a column on the left side of the screen as linked-to appliance icons 1191a. Meanwhile, the appliances 300 that can operate as a DMS, here a PC, NAS, and a mobile terminal, are displayed as linked-from appliance icons 1191b in a column on the right side of the screen. Since the mobile terminal may operate as a DMP, a DMR, or even as a DMS, the mobile terminal is displayed in both columns. The arrangement of the appliance icons 1191a and 1191b may also be linear, ring-shaped, star-shaped, or the like in accordance with the way in which the appliances are combined to provide the function. The appliance icons 1191a and 1191b are displayed so that such icons can be selected by the user. In the illustrated example, the linked-to appliance icons 1191a of the mobile terminal and the linked-from appliance icon 1191b of the NAS are selected. In addition, arrows are displayed between the appliance icons 1191a and 1191b showing the plurality of appliances 300 that can be combined. Such arrows are displayed in a form in keeping with the way in which the appliances that provide the function are combined.

In addition, in the combination evaluation screen 1190, points displays 1193a and 1192b are displayed corresponding to each of the functions. The numeric values in the points displays 1193a and 1193b are numeric values that reflect the results of evaluation by the evaluation unit 107. When a function or combination of appliances 300 specified by the recommendation unit 117 is also included in the notification information, the numeric value of the points displays 1193a and 1193b for such function or combination of appliances 300 specified by the recommendation unit 117 is set higher.

To visually inform the user of the correspondence to the respective combinations, each of points displays 1193a and 1193b are displayed on an arrow that connects the appliance icons 1191a and 1191b. In the illustrated example, since the points display 1193a is a points display for a combination of NAS and a television set, such points display 1193a is displayed on the arrow that points from the NAS to the television set. Similarly, since the points display 1193b is a points display for a combination of NAS and a mobile terminal, such points display 1193b is displayed on the arrow that points from the NAS to the mobile terminal. Note that to visually inform the user of the result of evaluation or recommendation, points displays 1193a and 1193b may be displayed using a graph, a number of stars, or the like in addition to or in place of the display of a numeric value. Also, since the display would become complex if points displays 1193a and 1193b were displayed for every combination of appliances 300, only the points displays relating to combinations of appliances 300 selected by the user may be displayed. In the illustrated example, since the linked-from appliance icon 1191b of the NAS and the linked-to appliance icon 1191a of the mobile terminal have been selected by the user, only the points display 1193b for the combination of such appliances and the points display 1193a for a combination of the NAS and the television set for comparison purposes are displayed.

In addition, optional information such as "How to Use" and "View Usage History" may be displayed on the combination evaluation screen 1190. When "How to Use" has been selected, an explanation of how to use a combination of appliances 300 selected by the user is displayed. This usage explanation may be included in the setting procedure information acquired by the setting procedure information acquiring unit 121, for example. When "View Usage History" has been selected, the usage history of the combination of appliances 300 selected by the user is displayed. The usage history is generated using the usage history information acquired by the usage history information acquiring unit 115.

In addition, when a function or combination of the appliances 300 specified by the recommendation unit 117 is included in the notification information, the combination evaluation screen 1190 may display that such function or combination of the appliances 300 has been recommended. For example, by highlighting the points display for the combination of the appliances 300 recommended by the recommendation unit 117, such as by making the points display flash, in the combination evaluation screen 1190, it is possible to show that such function or combination of the appliances 300 has been recommended.

According to the configuration of the second exemplary embodiment described above, the user is capable of receiving support in order to make appropriate use of a function or combination of appliances according to a different process to the first embodiment, i.e., according to a process where the user first selects a function and then selects a combination of appliances that provides such function based on evaluations or recommendations for a plurality of combinations.

3. Third Embodiment

A third exemplary embodiment will now be described with reference to FIG. 15. Note that although the system configuration (which was described in the first embodiment with reference to FIG. 1) and the operation of the appliance recognizing unit 103 of the information processing apparatus 100 in the third exemplary embodiment differ compared to the first or second embodiments, the other functional configuration is substantially the same as the first or second embodiment, and therefore detailed description is omitted.

Figure 15:
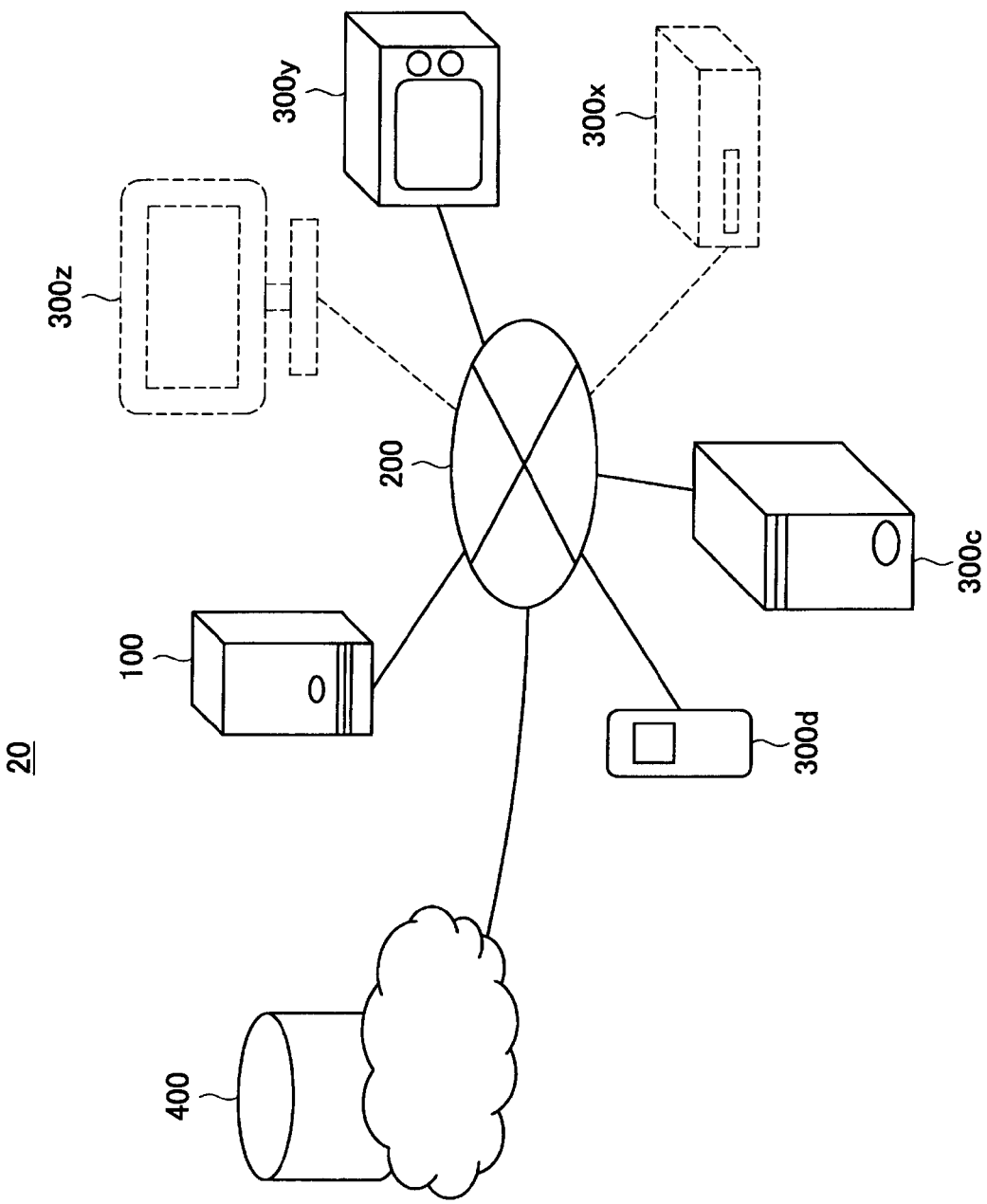
FIG. 15 is a diagram showing one example of the configuration of an information processing system, according to a third exemplary embodiment.

FIG. 15 is a diagram showing one example of the configuration of an information processing system 20 according to the third exemplary embodiment. As shown in FIG. 15, the information processing system 20 includes the information processing apparatus 100, the network 200, the appliances 300, and the database 400. The appliances 300 include the NAS 300c, the mobile terminal 300d, and an old-model television set 300y connected to the network 200. A video recorder 300x and a new-model television set 300z may be connected to the network 200 but are not set up at the present time. Here, the video recorder 300x is an appliance that can be added to the appliances 300. The new-model television set 300z is an appliance that can take the place of the old-model television set 300y out of the appliances 300.

In addition to recognizing the appliances 300 via the communication unit 101, the appliance recognizing unit 103 of the information processing apparatus 100 recognizes appliances that may be added to the appliances 300 or used in place of any of the appliances 300. More specifically, the appliance recognizing unit 103 recognizes the video recorder 300x that may be added to the appliances 300 and the new-model television set 300z that is an appliance that can be used in place of the old-model television set 300y out of the appliances 300. The appliance recognizing unit 103 may recognize such appliances based on information on appliance types of associated, that is, linked, devices included in the linked function information out of the appliance information acquired by the appliance information acquiring unit 105. For example, when the appliances 300 conform to DLNA (registered trademark), in the function information of the mobile terminal 300d, "video recorder" can be acquired as an appliance type of a DMS of a linked device for a case where the mobile terminal 300d is used as a DMP. However, since a video recorder is not set up at the present time, the appliance recognizing unit 103 virtually recognizes the video recorder 300x as an appliance that can be added to the appliances 300. In the appliance information of the NAS 300c, "old-model television set" and "new-model television set" can be obtained as appliance types of a DMP that are linked devices in the case where the NAS 300c is used as a DMS. At the present time, since the old-model television set 300y is set up but the new-model television set 300z is not set up, the appliance recognizing unit 103 virtually recognizes the new-model television set 300z as an appliance that can take the place of the old-model television set 300y out of the appliances 300.

Such virtual recognition by the appliance recognizing unit 103 of appliances that are not set up at the present time may be carried out only when a specified criterion is satisfied. For example, when it is found, based on evaluation results of the evaluation unit 107 for the performance of a combination of the video recorder 300x and the mobile terminal 300d when it is assumed that the video recorder 300x has been set up and the performance of a combination of the NAS 300c that has already been set up and the mobile terminal 300d, that the function provided when the video recorder 300x has been set up is superior by a specified criterion or more, the appliance recognizing unit 103 may virtually recognize the video recorder 300x as an appliance that may be added to the appliances 300. In such case, the evaluation result of the evaluation unit 107 is fed back to the appliance recognizing unit 103 and appliance recognition is carried out again. In the same way, it is possible to decide whether to virtually recognize the new-model television set 300z, using evaluations by the evaluation unit 107. In this way, by recognizing virtual appliances in accordance with some criteria, it is possible to selectively provide only information thought to be useful to the user.

According to the configuration of the third exemplary embodiment described above, when the user is considering adding to or replacing the appliances that the user currently owns, it is possible to obtain information on appliances that realize combinations of appliances that provide more effective functions, and therefore possible to add or replace appliances as appropriate.

4. Supplementary Information

Although exemplary embodiments have been described in detail with reference to the attached drawings, the described exemplary embodiments are not limited to the above examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-127081 filed in the Japan Patent Office on Jun. 2, 2010, the entire content of which is hereby incorporated by reference.

What is claimed is:

1. An apparatus, comprising:
an identification unit configured to identify a plurality of associated devices via a network;
a receiving unit configured to receive information corresponding to the associated devices, the information comprising a function provided by the associated devices, a usage history of the associated devices, and performance data corresponding to the associated devices;
a generation unit configured to generate a first value and a second value of an execution metric describing at least one of an execution of the function by the associated devices or the performance data corresponding to the associated devices, based on at least the received information;
an output unit configured to output the generated first metric value; and
a recommendation unit configured to:
    generate a recommendation comprising a subset of the associated devices or at least one of the plurality of functions, based on at least one generated metric value;
    select first and second subsets of the associated devices, the first and second subsets being associated with first and second frequencies;
    obtain a third value of the execution metric corresponding to the execution of the selected function by the first subset, and obtain a fourth value of the execution metric corresponding to the execution of the selected function by the second subset;
    determine whether the first frequency exceeds a threshold frequency, and whether the third value exceeds the fourth value;
    select the first subset for the recommendation, when the first frequency fails to exceed the threshold frequency, and when the third value exceeds the fourth value;
    select a function for the recommendation from the plurality of functions;
    obtain usage history information corresponding to the associated devices, the usage history information comprising frequencies at which the selected function is executed by the associated devices; and
    select at least one subset of the associated devices for the recommendation, based on at least an obtained second metric value and the usage history information.

2. The apparatus of claim 1, wherein the received information further comprises at least one of (i) information identifying the associated devices or (ii) information specifying modes of connection between the associated devices.

3. The apparatus of claim 1, wherein the performance data comprises at least one of (i) a power consumption of the associated devices or (ii) a format of content supported by the associated devices.

4. The apparatus of claim 1, wherein the received information further comprises information associated with content accessible to a user.

5. The apparatus of claim 4, wherein the user content information comprises at least one of a number of accessible content elements or a type of formats of the accessible content elements.

6. The apparatus of claim 1, wherein the usage history comprises at least one of a frequency at which the user executes the function or a frequency at which the user accesses the associated devices.

7. The apparatus of claim 1, wherein the generation unit is further configured to:
generate the first metric value based on a plurality of evaluation rules associated with the received information.

8. The apparatus of claim 7, wherein the generation unit is further configured to:
compute scores corresponding to the plurality of evaluation rules; and
generate the first metric value based on a product of the computed scores.

9. The apparatus of claim 1, wherein:
the received information further comprises a plurality of functions provided by the associated devices, or a plurality of performance data corresponding to the associated devices; and
the generation unit is further configured to generate a plurality of values of the execution metric describing executions of the plurality of functions by the associated devices, or the plurality of performance data corresponding to the associated devices, based on at least the received information.

10. The apparatus of claim 9, wherein the recommendation unit is further configured to:
select a subset of the associated devices for the recommendation;
obtain values of the execution metric corresponding to the execution of the plurality of functions by the selected subset; and
select at least one of the plurality of functions provided by the selected subset for the recommendation, based on at least the obtained metric values.

11. The apparatus of claim 1, further comprising:
an instruction unit configured to generate an instruction that enables a subset of the associated devices to execute the function.

12. The apparatus of claim 11, wherein the instruction unit is further configured to:
transmit the generated instruction to the subset of associated devices, wherein the subset of associated devices are configured to execute the function in Reply to the generated instruction.

13. The apparatus of claim 1, wherein the identification unit is further configured to:
identify an additional device within the network, based on at least the information corresponding to the associated devices.

14. The apparatus of claim 13, wherein the additional device is operable to execute the function in conjunction with at least one of the associated devices.

15. The apparatus of claim 1, wherein the function comprises a playback function.

16. A computer-implemented method for evaluating device performance, comprising:
identifying a plurality of associated devices, the associated devices
being accessible to a user via a network;
receiving information corresponding to the associated devices, the information comprising a function provided by the associated devices, a usage history of the associated devices, and performance data corresponding to the associated devices;
generating, using a processor, a first value and a second value of an execution metric describing at least one of an execution of the function by the associated devices of the performance data corresponding to the associated devices, based on at least the received information;
generating a recommendation comprising a subset of the associated devices or at least one of the plurality of functions, based on at least one generated metric value;
selecting first and second subsets of the associated devices, the first and second subsets being associated with first and second frequencies;
obtaining a third value of the execution metric corresponding to the execution of the selected function by the first subset, and obtain a fourth value of the execution metric corresponding to the execution of the selected function by the second subset;
determining whether the first frequency exceeds a threshold frequency, and whether the third value exceeds the fourth value;
selecting the first subset for the recommendation, when the first frequency fails to exceed the threshold frequency, and when the third value exceeds the fourth value;
selecting the first subset for the recommendation, when the first frequency fails to exceed the threshold frequency, and when the third value exceeds the fourth value;
selecting a function for the recommendation from the plurality of functions;
obtaining usage history information corresponding to the associated devices, the usage history information comprising frequencies at which the selected function is executed by the associated devices;
selecting at least one subset of the associated devices for the recommendation, based on at least an obtained second metric value and the usage history information; and
outputting the generated metric value.

17. A non-transitory, computer-readable storage medium storing a program that, when executed by a processor, causes the processor to perform a method for evaluating device performance, comprising:
identifying a plurality of associated devices, the associated devices being accessible to a user via a network;
receiving information corresponding to the associated devices, the information comprising a function provided by the associated devices, a usage history of the associated devices, and performance data corresponding to the associated devices;
generating, using a processor, a first value of an execution metric
describing at least one of an execution of the function by the associated devices or the performance data corresponding to the associated devices, based on at least the received information;

generating a recommendation comprising a subset of the associated devices or at least one of the plurality of functions, based on at least one generated metric value;

selecting first and second subsets of the associated devices, the first and second subsets being associated with first and second frequencies;

obtaining a third value of the execution metric corresponding to the execution of the selected function by the first subset, and obtain a fourth value of the execution metric corresponding to the execution of the selected function by the second subset;

determining whether the first frequency exceeds a threshold frequency, and whether the third value exceeds the fourth value;

selecting the first subset for the recommendation value, when the first frequency fails to exceed the threshold frequency, and when the third value exceeds the fourth;

selecting a function for the recommendation from the plurality of functions;

obtaining usage history information corresponding to the associated devices, the usage history information comprising frequencies at which the selected function is executed by the associated devices;

selecting at least one subset of the associated devices for the recommendation, based on at least an obtained second metric value and the usage history information; and outputting the generated metric value.

* * * * *